(12) United States Patent
Arkhangelskiy et al.

(10) Patent No.: US 10,086,894 B2
(45) Date of Patent: Oct. 2, 2018

(54) SAFETY DEVICE

(71) Applicant: Alex O. Arkhangelskiy, San Jose, CA (US)

(72) Inventors: Alex O. Arkhangelskiy, San Jose, CA (US); Johannes Boot, Oakland, CA (US); David M. Hadden, Los Altos, CA (US); Taylor Alexander, Ben Lomond, CA (US); David Venhaus, Wauwatosa, WI (US); Hugo Haselhuhn, Paso Robles, CA (US)

(73) Assignee: Brake Free Technologies

( * ) Notice: Subject to any disclaimer, the term of this patent is extended or adjusted under 35 U.S.C. 154(b) by 113 days.

(21) Appl. No.: 15/260,236

(22) Filed: Sep. 8, 2016

(65) Prior Publication Data

US 2017/0066492 A1     Mar. 9, 2017

Related U.S. Application Data

(60) Provisional application No. 62/215,682, filed on Sep. 8, 2015.

(51) Int. Cl.
| | |
|---|---|
| *B62J 6/00* | (2006.01) |
| *B60Q 1/26* | (2006.01) |
| *B60Q 1/44* | (2006.01) |
| *B60Q 1/34* | (2006.01) |
| *A42B 3/04* | (2006.01) |

(52) U.S. Cl.
CPC .............. *B62J 6/005* (2013.01); *A42B 3/0453* (2013.01); *B60Q 1/2673* (2013.01); *B60Q 1/2676* (2013.01); *B60Q 1/346* (2013.01); *B60Q 1/444* (2013.01); *B60Q 1/445* (2013.01); *B62J 2300/002* (2013.01)

(58) Field of Classification Search
CPC ........ B62J 6/005; B60Q 1/2676; B60Q 1/445; B60Q 1/2673; B60Q 1/444; B60Q 1/346; A42B 3/0453
See application file for complete search history.

(56) References Cited

U.S. PATENT DOCUMENTS

| | | | | |
|---|---|---|---|---|
| 7,221,263 | B2 * | 5/2007 | Moore | A42B 3/0453 340/427 |
| 8,334,762 | B2 * | 12/2012 | Szeljack | A42B 3/0453 340/475 |
| 2014/0210609 | A1 * | 7/2014 | Yang | B60Q 1/2676 340/463 |

* cited by examiner

*Primary Examiner* — Thomas M Sember
(74) *Attorney, Agent, or Firm* — Tiburon Intellectual Property, PLLC; Frank M. Washko

(57) ABSTRACT

Disclosed is a system for providing vehicle indicator lights, such as brake lights for a bicycle or motorcycle. The system may include at least one indicator light, a gyroscopic sensor, an accelerometer, a power supply, and a signal processing unit that receives inputs from the gyroscopic sensor and the accelerometer and activates an indicator light based on inputs from the sensors. Various algorithmic functions and other features may also be included in the system to make detection more robust and the make the system useable for a variety of different vehicle applications.

20 Claims, 12 Drawing Sheets

Heading is the sensor x-axis projected on the horizontal plane

Acceleration and deceleration is calculated along the heading vector

Motion Gesture Actited Features

SAFETY DEVICE

CROSS-REFERENCE TO RELATED APPLICATION

This application claims priority benefit of U.S. Provisional Patent Application No. 62/215,682 entitled "Safety Device," filed Sep. 8, 2015. The disclosure in that application is incorporated herein in its entirety.

BACKGROUND AND SUMMARY

The present invention relates generally to vehicle safety and indicator systems, and more particularly to helmet-based indicator lights for two-wheeled vehicles.

There are many devices available for adjunct visual warning that a vehicle is slowing down or stopping besides factory installed brake lights. Studies show that an increase in visual warning when a vehicle is braking reduces rear end collisions. A report published by the NTSB in march of 1998 states that the third brake light, or Center HIgh Mounted Signal Lamp (CHIMSL), mandated for all cars built after 1986, prevents at least 92,000 crashes each year and 58,000 injuries; a reduction of about 4.3%.

Many of the aftermarket braking devices are relatively inexpensive and easy to install, but typically haven't sold well because, like life insurance, they are not something people think about. Safety devices in general are a hard sell and most existing products on the market are not interesting to use or pleasing aesthetically. No commercially-available CHIMSL system for two-wheeled vehicles currently exists.

The present system may solve these problems and others by providing a CHIMSL indicator lamp mounted in or on a helmet, for use with two-wheeled vehicles, in communication with a sensor and processor system that uses sensed the decrease in velocity to activate the indicator lamp. In some cases, this would optimally be the rate of decrease in forward velocity of the vehicle.

As a non-limiting example, the preferred embodiment of the system may include a helmet with an indicator lamp housing and battery removably mounted to the helmet. A processor, accelerometer, and gyroscope contained within the lamp housing may be programmed with software to determine when a braking event is occurring, then activate the braking indicator lamp on the helmet, to act as a CHIMSL for the vehicle.

DETAILED DESCRIPTION

While the exemplary embodiments illustrated herein may show various features, it will be understood that the different features disclosed herein can be combined variously to achieve the objectives of the present invention.

The overall concept of the present invention is to provide a high mounted indicator lamp system for vehicles that do not have a roof or other high structure to mount them to. These vehicles could include a motorcycle, a bicycle, a tricycle, a four-wheeled ATV, or similar vehicles. Because each of these vehicles has in common helmets, a logical choice for the location of the indicator lamp is in or on the back of the rider's helmet. However, any location for the indicator lamp could be used within the scope of this invention, such as the back of the rider's jacket, vest, mounted to his shoulder, mounted to a backpack, motorcycle bags, or other similar locations.

Figure 1:
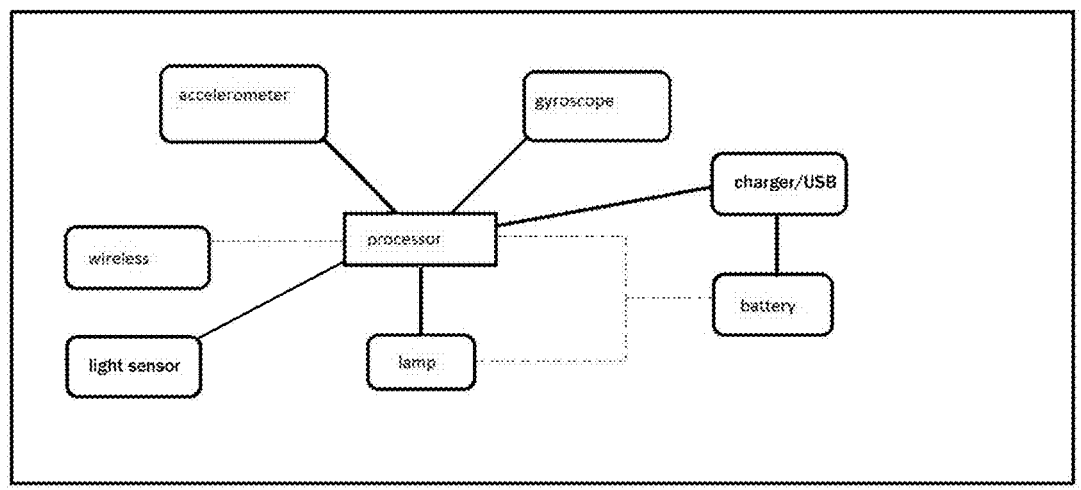
FIG. 1 shows a system layout of one embodiment of the disclosed invention.

Turning to FIG. 1, this describes one embodiment of the brake lamp system where a brake indicator lamp could be mounted in or on the back of the rider's helmet, along with a battery. The system further requires a processor, a selection of sensors, and software resident in memory to interpret the data from the sensors in order to activate the indicator lamp when the appropriate decrease in velocity is sensed. The sensors may include any combination of accelerometers, gyroscope, GPS, or any other sensors helpful in determining decrease in velocity of the vehicle. In this embodiment, the entire system could be housed within the helmet itself, or in a single detachable lamp housing.

Figure 2:
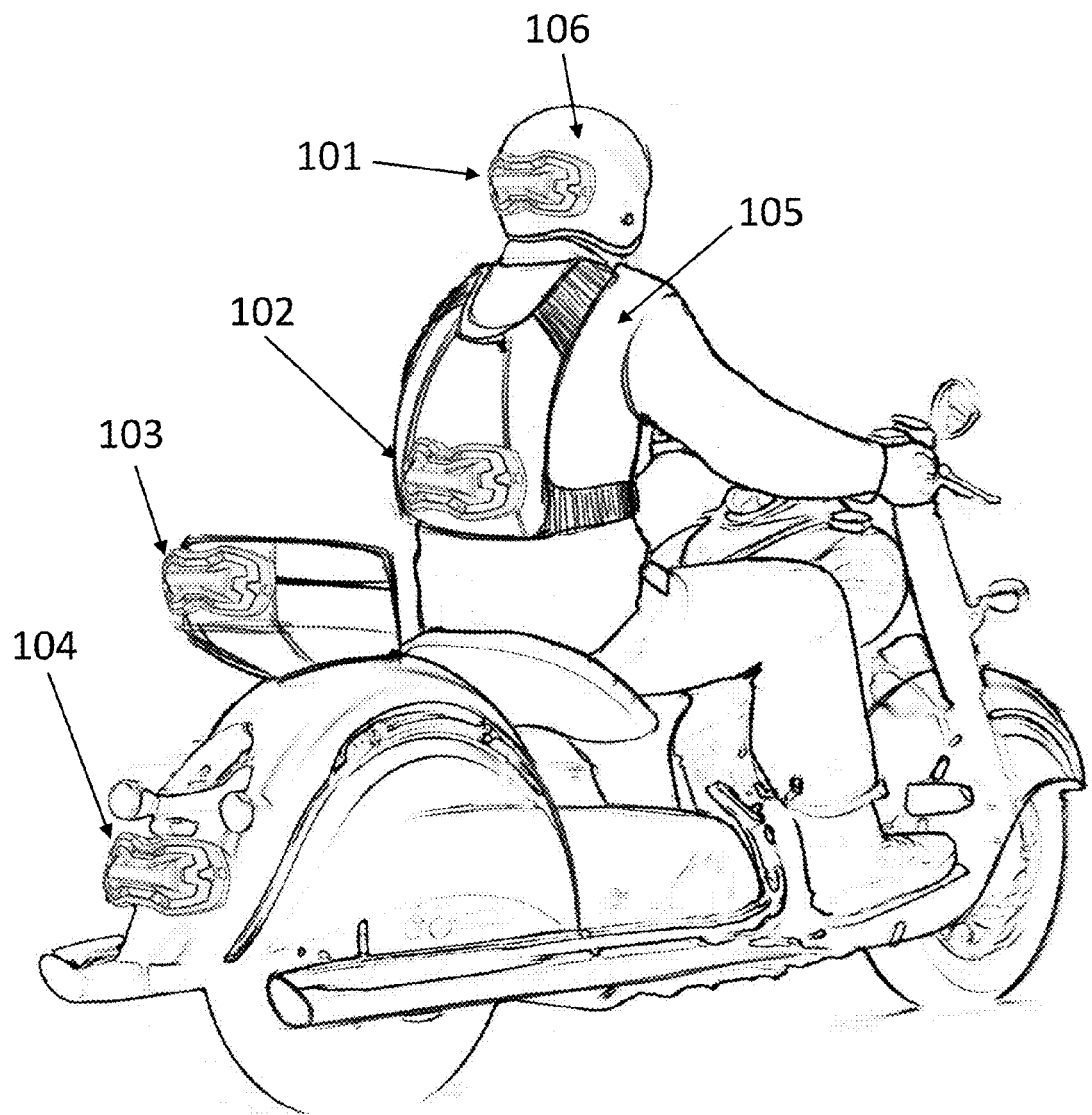
FIG. 2 a standalone unit of the disclosed invention as applied to different attachment points for a motorcycle user.

Turning to FIG. 2, this figure shows that such an indicator light system could be attached to a user's helmet 101, to a user's clothing (backpack, jacket, etc.) 102, to a saddle bag 103, or to the vehicle itself 104.

Turning to another embodiment, the system may be designed wherein the processor, sensors, and logic may be used from a smartphone, or similar module that contains sensors and logic for measurement purposes. The output of the sensors can be measured to determine the decrease in velocity signal to activate the brake light, and then the activation signal is sent to the indicator in the helmet. This communication may be over a short range wireless signal, such as 802.11 wifi, Bluetooth, or any other suitable communication medium. Therefore, the helmet may have only a light, battery, and communication circuit. The more expensive logic may be used from the rider's smartphone.

Further, this embodiment application may use a smartphone to control battery or vehicle powered radio-controlled adjunct brake light modules that can be mounted on the helmet, or anywhere on a vehicle or the vehicle operator's riding gear in the case of a motorcycle. Measuring the rate of change of velocity of a vehicle is possible if the orientation of the accelerometers with respect to the orientation of the vehicle is known. It is possible to mount a cellphone in a bracket on a vehicle and manually calibrate its orientation with the vehicle.

However, in another embodiment, it is also possible, to program a smartphone to use its internal operating system and software along with the built-in sensors to automatically create virtual axes that align with those of the vehicle with which it is being used regardless if it is placed in a mounting fixture on the vehicle, or carried on the vehicle operator's person.

Figure 3:
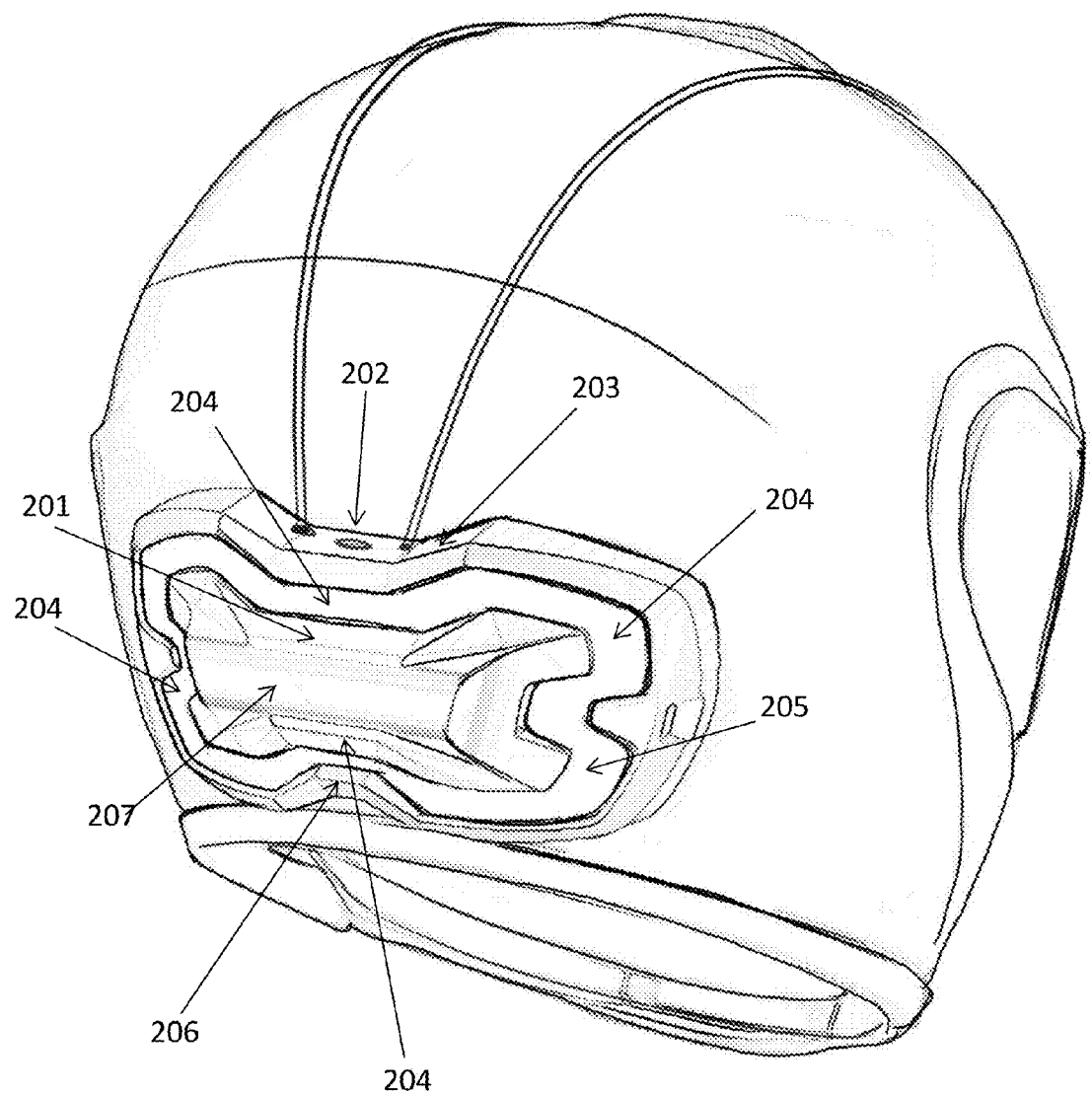
FIG. 3 shows one embodiment of the system as applied to the rear of a helmet.
Figure 4:
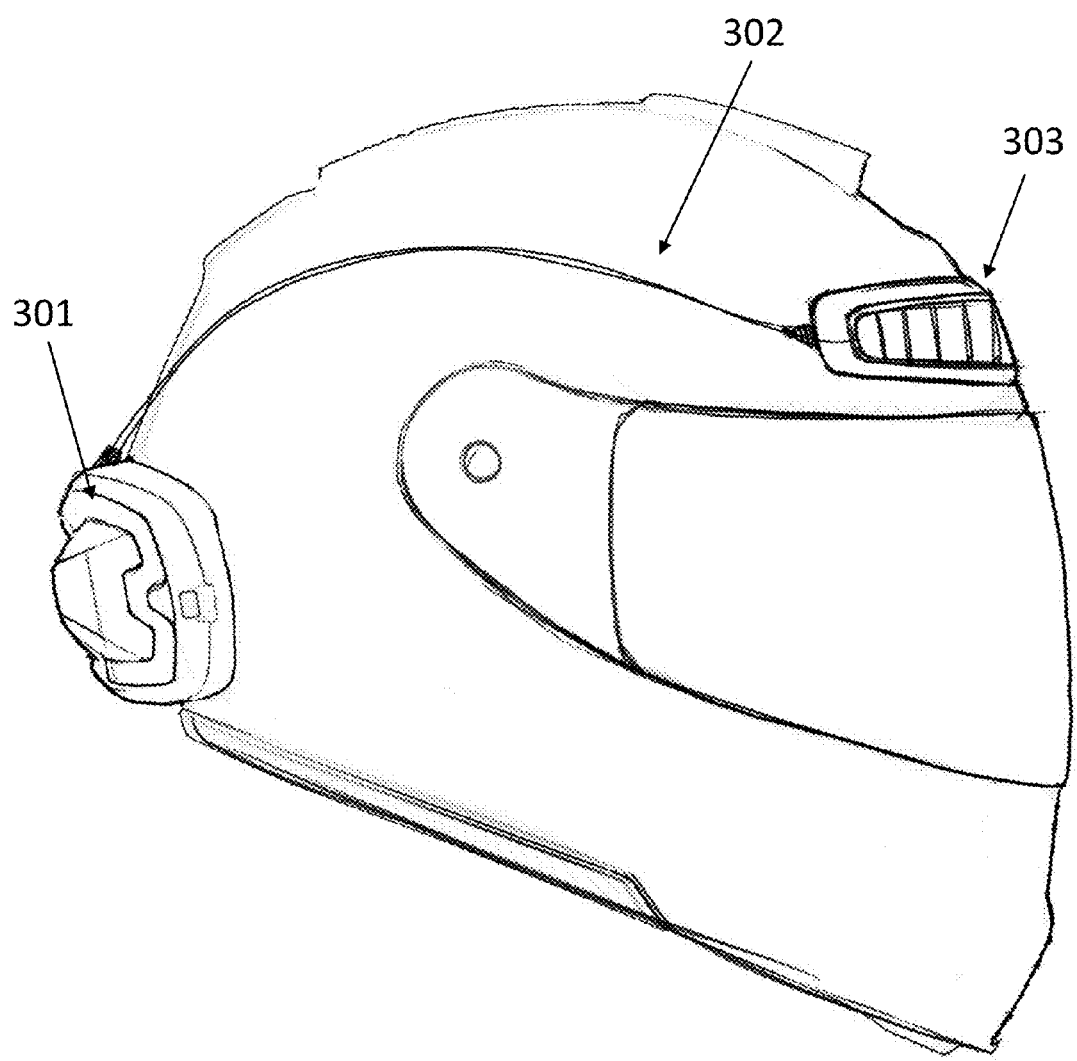
FIG. 4 shows another embodiment of the system as applied to a helmet in side view.

Turning to FIG. 3, this figure shows an embodiment of the system as a standalone unit 206, with all of the components contained in the single unit. The unit includes brake light 207 and turn signal indicators 204 included. The unit further includes a power button 202 and a USB interface 203. All electronics, sensors, logic, and power supply are internal to the single unit. The unit is attached to a helmet in FIG. 4, but the standalone unit could also be attached to various other items. As shown in FIG. 4, the unit could also use a front-facing indicator light or headlight operable with the system.

Figure 5:
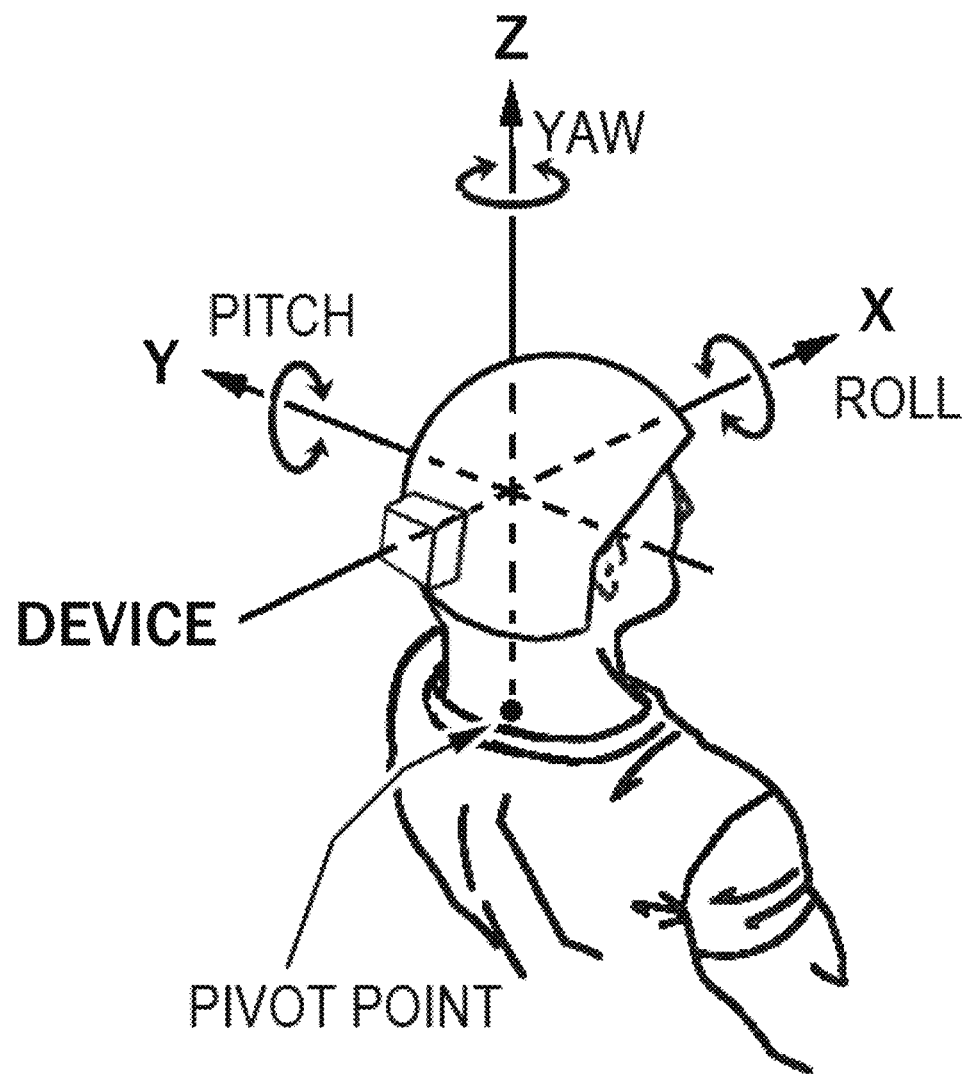
FIG. 5 shows the rotational axes of the head of a user of the disclosed invention.

Turning to FIG. 5, this figure shows the preferred virtual axes with respect to a motorcycle, but this alignment would be true for any vehicle. Rotation about the Z-axis is yaw, around the X-axis is pitch, and the Y-axis is roll, as illustrated in FIG. 4. The decrease in velocity of a motorcycle rider, for example, is beyond a certain threshold of pitch rate that is sensed. It may be desirable that movements of the operator which are detected by the smartphone as acceleration or decrease in velocity due to non-braking events can be differentiated from those caused by actual increase or decrease in velocity of the vehicle. It may be necessary to filter out a number of other velocity change signals that do not represent braking—such as, raising or lowering of the rider's head, yaw and centripetal acceleration in turns, body rotations about the waist, rotating of the rider's head to look left and right, bumps in the road, travelling uphill or downhill, and so on. Therefore, a complex filter may be used in the processor logic to determine when to activate the brake light. As stated above, this may be calibrated manually, or calibrated automatically by the smartphone.

A preferred method for triggering warning lights is based on measuring change in velocity. Gyroscopes are used in the preferred embodiment to validate and/or estimate sensor orientation and improve detection of vehicle braking. However, other similar technologies could be used to serve the same function—to determine the orientation of the system for improve braking prediction. It may be difficult to know the relevant axis/axes of deceleration that are pertinent to braking. Therefore, the orientation sensor, or a gyroscope, may be used to determine the appropriate braking axis or vector for analysis. This may be true not only for riding in a straight line, where the sensor may be at different orientations for different riders (depending how the unit is attached, whether the rider is leaning over, or whether it is on the helmet or backpack, etc.), but may also be pertinent when the vehicle is going through turns. In turns, the system may experience additional accelerations due to centripetal acceleration, and the orientation sensor may further assist the system to differentiate braking accelerations from other accelerations, by analyzing the orientation change of the system. For example, if the rider is leaning through a turn, the two sensor outputs may be combined and processed to more accurately identify braking.

For the purposes of this application, the processor in the unit that processes and determines whether to light the indicator light will be called the "signal processing unit," which may include logic integrated with the sensor(s), or complete in a central processing unit (CPU), any combination of the two, or any combination known in the art. Therefore, the gyroscope and/or accelerometer signal may be pre-processed before it is sent to a central processor to determine whether to light the brake light, or the raw signal may be sent to the CPU for complete processing.

In yet another embodiment, a helmet may be used that contains all elements of the system, including the light, a battery, battery level indicator, a processor, memory, and software, that interface with sensors in the helmet, including an accelerometer that senses decrease in velocity jerk, and a gyroscope that filters out head rotations. The system may further contain optional features, such as a power button, a light sensor to automatically activate at night. In another embodiment, a smartphone can be held into a helmet, and all features, including the brake light, are included in the smartphone. In another embodiment, the helmet may contain the light, battery, and a wireless transmitter, while the processor, logic, sensors, and wireless transmitter may be housed in a device or smartphone held by the rider or on the bike. In another embodiment, the processor, logic, sensors, and wireless transmitter may be housed in the motorcycle itself, and the braking signal may be sent to the helmet. In yet another embodiment, a module in the motorcycle may sense when the brakes are applied, or when the motorcycle brake light is activated, then a braking signal is sent to a wireless transmitter, where the braking signal is relayed to the helmet, where the signal is received and the light is activated. Such a system may not need to rely on acceleration signal input to activate the helmet CHMSL light. Any of these implementations may use a smart phone with wireless transmitter to use as user interface, and for ride data logging and review.

In yet another embodiment, the wireless transmitter, battery, and light may be a single unit that can be attached to a standard helmet. In another embodiment, all of the system components may be placed into a single light housing, with sensors, which is attachable to a standard helmet. Clearly, a number of different system configurations are possible, as well as different distributions of the components, in order to achieve the desired results of the disclosed invention.

Figure 12:
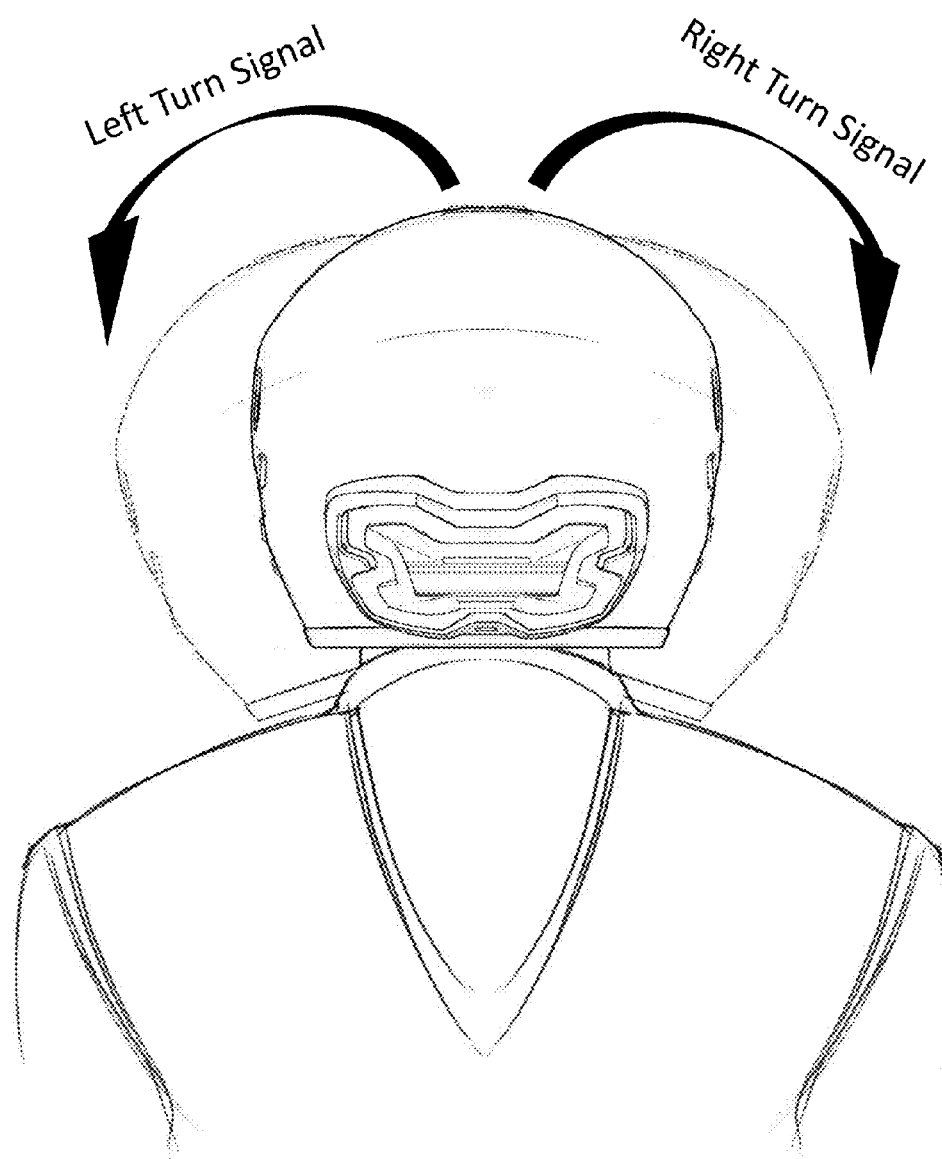
FIG. 12 shows gestures for activation of turn signals in one embodiment of the present invention.

In another embodiment, the system could also have a provision for turn signals. For example, the helmet lamp may include left and right turn signals. The signals may then be activated by a gesture to activate the sensors, such as the accelerometer or gyroscope, to indicate a turn. One example may be to rotate the head to the right or left (roll) to indicate a corresponding lamp to activate, or forward and back to activate the brake light. This embodiment is illustrated in FIG. 12. Then, once the sensor input is filtered by the processor, the signal is sent to the helmet to activate the corresponding lamp—or the attached indicator lamps, in the case of a single, standalone unit with braking and turn indicator lamps attached. Or, in the case where the logic is contained wholly within the motorcycle, when the right or left turn lamps are activated on the motorcycle, a wireless signal may be sent to the helmet to activate the corresponding lamp with no gesture or sensor input required. In a further variation of these concepts, the system may include a light sensor. The light indicator may be used to save power by turning off running lamps or other optional features during the daytime. Or, it could be used for other power-saving features, such as turning the unit off during the daytime. The system may further include a battery charge indicator. In a variation of the embodiment where only the lamp, battery, and wireless transmitter is contained in the helmet, the helmet may be automatically paired (such as Bluetooth) with the processor and sensors in the motorcycle or phone as soon as they are in proximity of each other.

Figure 10:
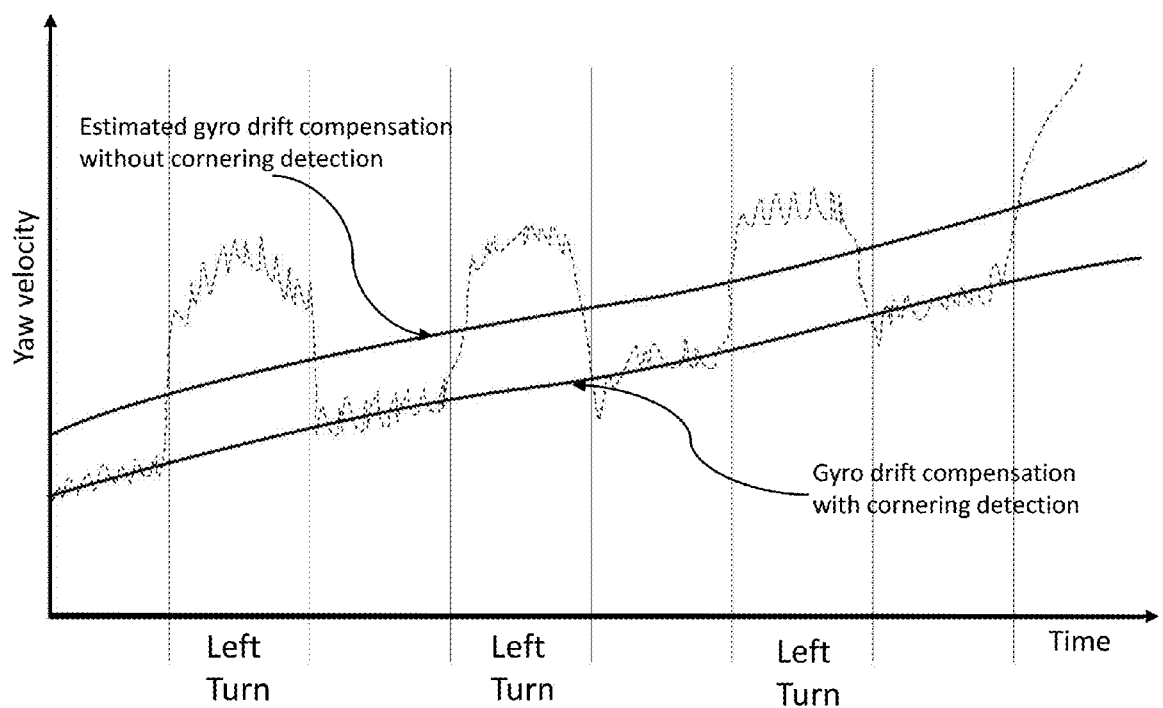
FIG. 10 illustrates drift compensation and cornering detection by the unit.

Turning to algorithms for the interpretation and filtering of sensor data to discern when actual vehicle the decrease in velocity is occurring, a wide variety of different algorithms are possible within the spirit of this invention. The goal is to filter false positive motions out of the various different motions that a body—and head, in the case of a helmet—encounter during vehicle motion. In one embodiment of the algorithm, decrease in velocity can be estimated from the accelerometer data, given that the orientation of the sensor, relatively to the motorcycle direction of motion is known. The state of the rider's head angular orientation and velocities may be estimated. One or more gyroscopes may be drift compensated and/or filtered to estimate angular velocities. Gyroscope drift compensation may also be reduced or suspended during cornering, which is when leaning and/or yaw motion is detected. Cornering is the only non-averaging angular velocity and this effect may therefore be eliminated for accurate zero detection as shown in FIG. 10. Further, using a complementary filter or other method of sensor fusion that uses one or more accelerometer signals and one or more gyroscope signals may help to estimate head orientation, to compensate for the rider moving their head. Internally, Euler coordinates, quaternions, or another method may be used to represent relative orientation.

Figure 9:
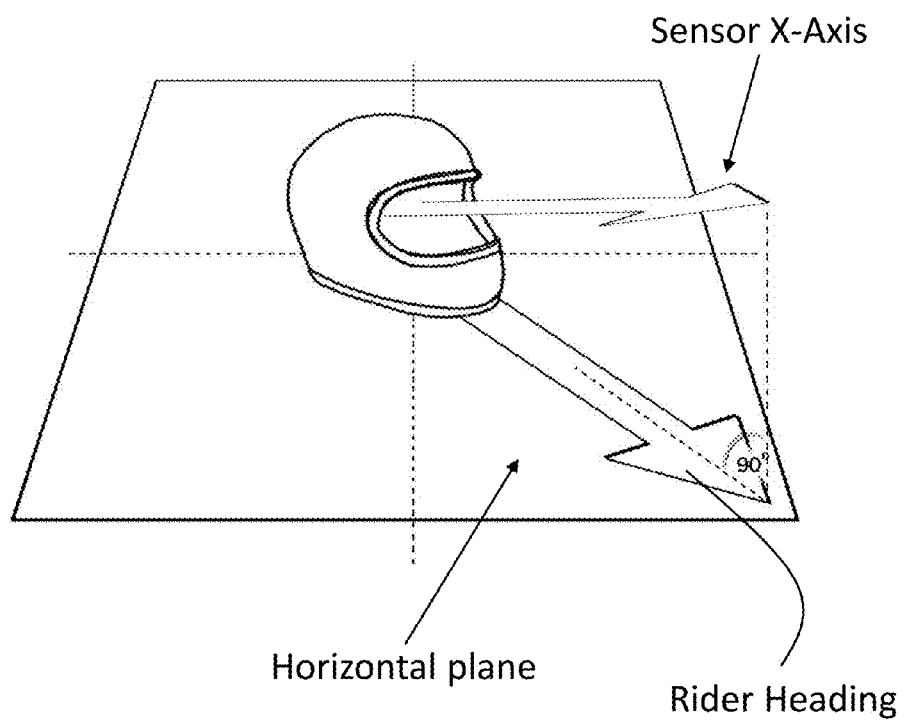
FIG. 9 shows the potential difference in directional angle between the axis of the accelerometer of the unit and the direction of the vehicle, which may be reconciled in some embodiments of the present invention.

In this embodiment, pitch and roll angles may calculated using the complementary filter, but the sensor orientation is used for yaw-angle. One can estimate the heading or travel direction, by projecting the sensor x-axis onto the horizontal plane as depicted in FIG. 9. The coordinate frame that is rotated such that the x-axis is within the span of the horizontal plane and describes the heading is called the "horizontal sensor coordinate frame." The complementary filter weighing may be modified such that it relies more on the gyroscopes and less on the accelerometer during cornering or speeding up and slowing down. Accelerations due to speeding up or slowing down, or centrifugal force when turning a corner are both non-averaging, as these 'cycles' can be of longer duration than the time constant of the complementary filter. This could lead to incorrect head orientation estimations. In addition to modifying the filter parameters once cornering is detected, multiple variables from the past may be stored, such that the 'clock can be turned back'. The variables can be calculated as if the filter parameters were adjusted a short time before the cornering started.

One benefit of this embodiment is that non-relevant accelerations may be eliminated. The embodiment may use only acceleration along the X-axis (forward direction) of the new coordinate frame. The X-axis may be the primary axis analyzed, because it is the primary axis that a rider pitches forwards and backwards during braking. Because it is converted to the horizontal frame, Z-direction accelerations such as gravity and bumps in the road may then not affect the measured acceleration. If the rider does not look forward, the detected acceleration is not a purely forward-facing acceleration, but contains both X and Y components. However, even with the rider's head at a 45 degree angle, the system can still measure 70% of the actual acceleration, which is sufficient to detect braking and decrease in velocity. When "looking into the corner," which is common when turning a curve, centrifugal force may cause a false acceleration in the horizontal-sensor-frame X-coordinate. However, this effect can be countered by adding compensation when 'leaning and cornering' (yaw and roll) are detected. Therefore, the orientation (gyroscope) sensor signal can be processed along with the accelerometer signal to determine a more accurate measurement of vehicle braking. One way to do this may be to use the gyroscope to isolate vehicle braking only in the horizontal frame, and to remove accelerations due to the other non-braking motions. An additional advantage of this system may be that it may detect braking during downshifting, or engine braking, as well as physical activation of the vehicle's brakes.

Figure 11:
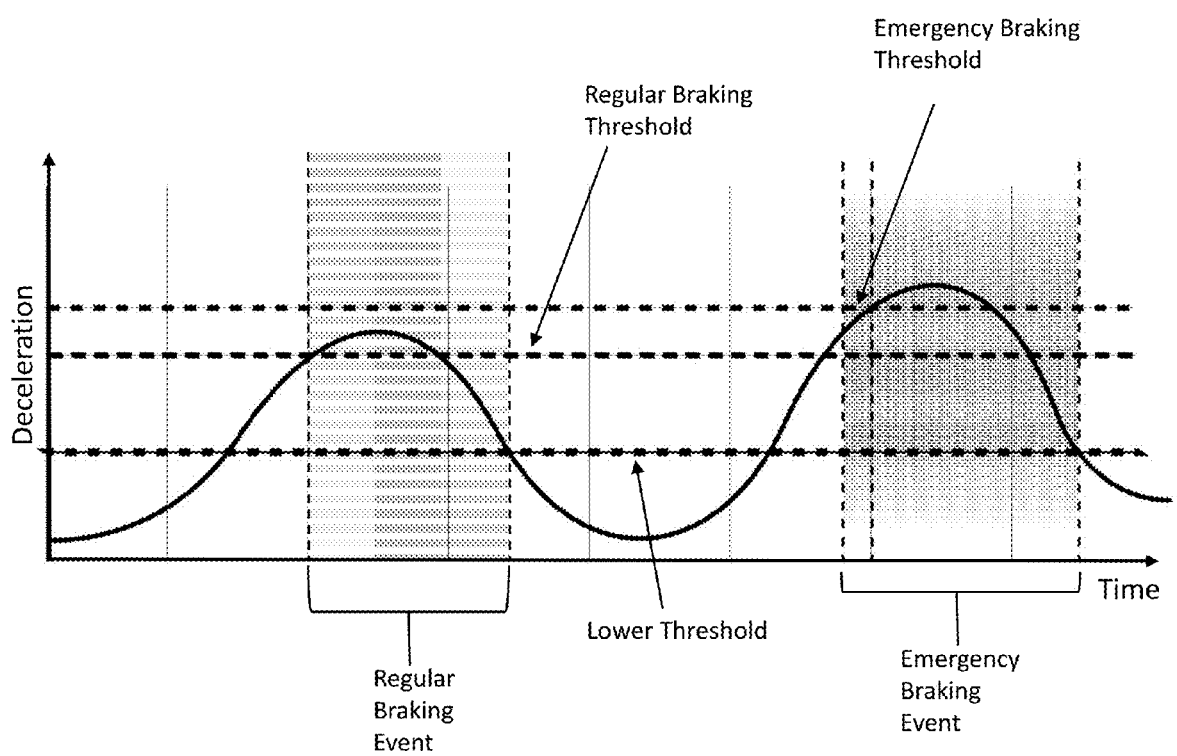
FIG. 11 shows threshold brake detection in one algorithm of the present invention.

Further, in this embodiment, accelerations that are only occurring due to rider movement, relative to the vehicle can be eliminated. The system can compensate for the perceived deceleration or decrease in velocity in the horizontal-sensor-frame X-axis while the driver is pitching forward. The result of all of these filtering algorithms is that decrease in velocity can be compared to a threshold value to determine a braking event. In this embodiment, the system may use a filter, such as a low-pass filter, on the sensor data and acceleration value. One a braking event is detected, the lamp can be illuminated. Further, if acceleration exceeds a second, higher value, an alternative lighting sequence, such as flashing or a brighter lamp intensity, may be activated to indicate an urgent, or panic, stop. Alternatively, this brake light pattern could be used if the same threshold is exceeded, but for a longer period of time. The time that the primary threshold has been exceeded in combination with another lower threshold comparison may be used to determine the on-time of the brake light. These thresholds and conditions are further illustrated for one embodiment in FIG. 11.

Figure 6:
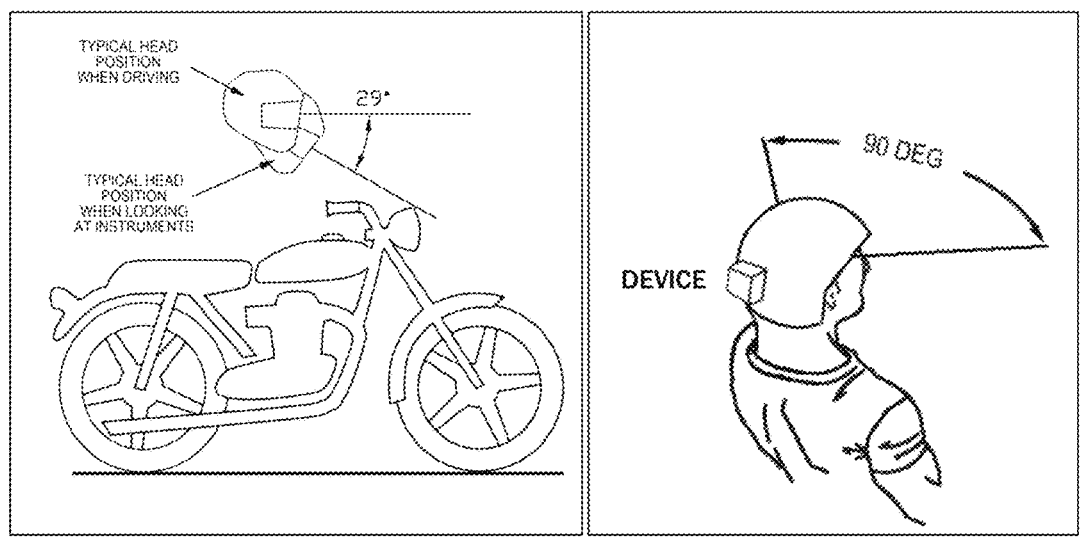
FIG. 6 shows the head rotations of a user of the disclosed invention, about two axes.

Turning to FIG. 6, this figure shows a rider pitching his head. The figure shows the center of rotation and arc length for the beginning and ending positions of head movement. In addition the angle of the Y axis of the complete unit with respect to the arc radius also changes as the head pitches. Arc lengths and centers for intermediate positions have been left out for clarity.

Such continuous changes also hold true when the neck or upper body provide movement in the roll, yaw, and upper body movement directions. Reasonable calculations of the forces seen by each of the X, Y and Z accelerometers in the smartphone for all of the head and upper body movements can be made by assuming the following acceleration profile is applied to any of these head and body movements.

Another element that affects measuring changes in motorcycle acceleration is the position of the rider's head during the time motorcycle is slowing down. Measurements were made of motorcyclists to determine the maximum range of head positions during braking and general driving. FIG. 6 shows the maximum ranges of head pitch and yaw that occur during normal riding conditions. Looking left or right (yawing the head) more than 45 degrees while braking would be an unusual situation. A rider pitching his head more than about 30 degrees down from his normal head position to look at his instruments would also be unusual. Therefore, filtering algorithms can be developed based on typical head motions and limits. In general, acceleration caused by road bumps, dips or a hill crown will have only a second order Z axis component and can be ignored. Likewise, the centrifugal force acting on a motorcycle can be when turning is collinear to the Y axis since motorcycle rider's bank to compensate for this force and may also be ignored. Therefore, the three primary sources of acceleration that will can sensed by a set of orthogonal accelerometers mounted in one embodiment of this system on the back of a typical motorcycle helmet are: head movement with respect to the body where the body remains stationary; body and head movement from the waist while in a sitting position where the head and body remain in a fixed relationship with each other; and motorcycle movement where the rider remains in a relative fixed position with respect to the motorcycle.

Figure 7:
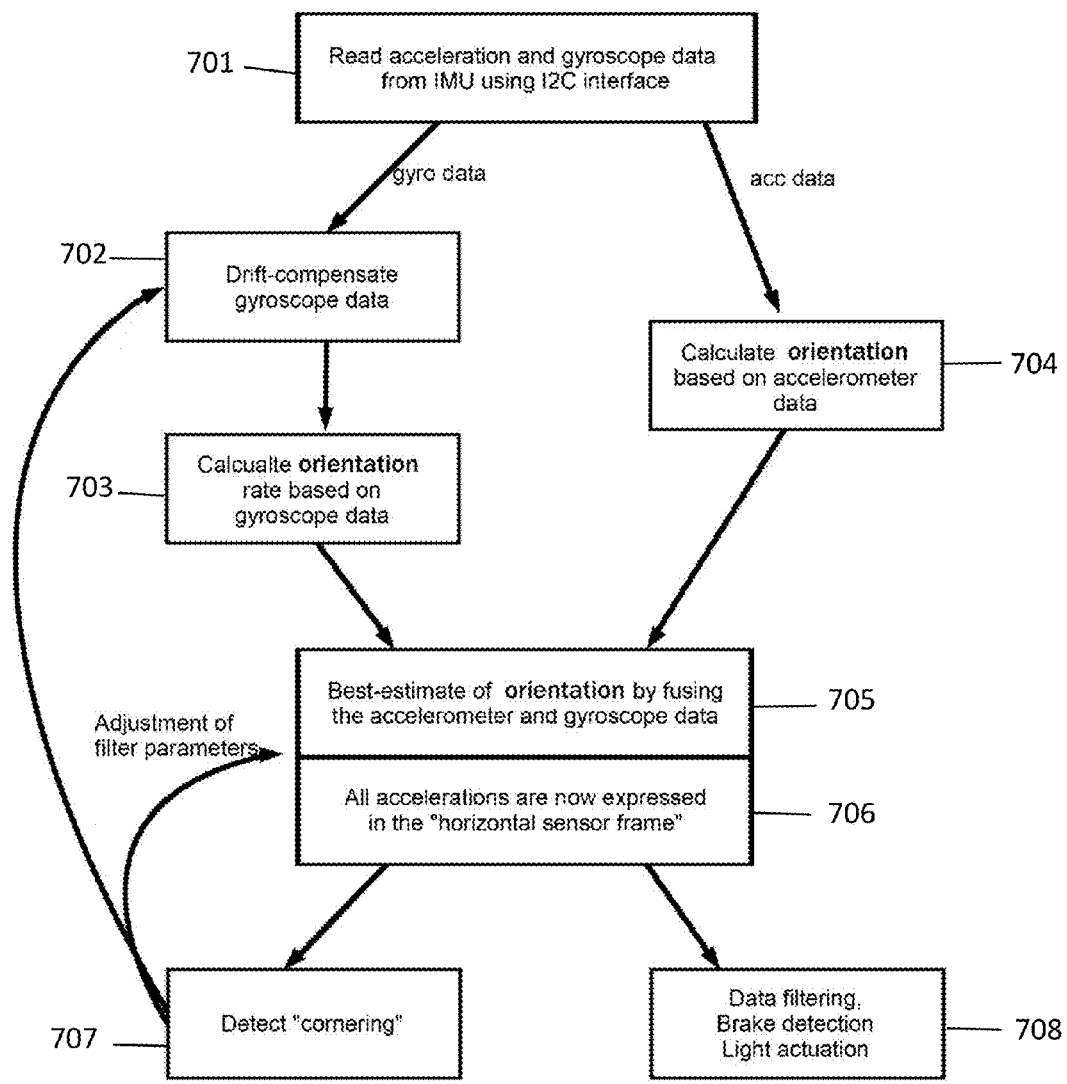
FIG. 7 shows a flowchart of the operation of the sensors in one embodiment of the present invention.
Figure 8:
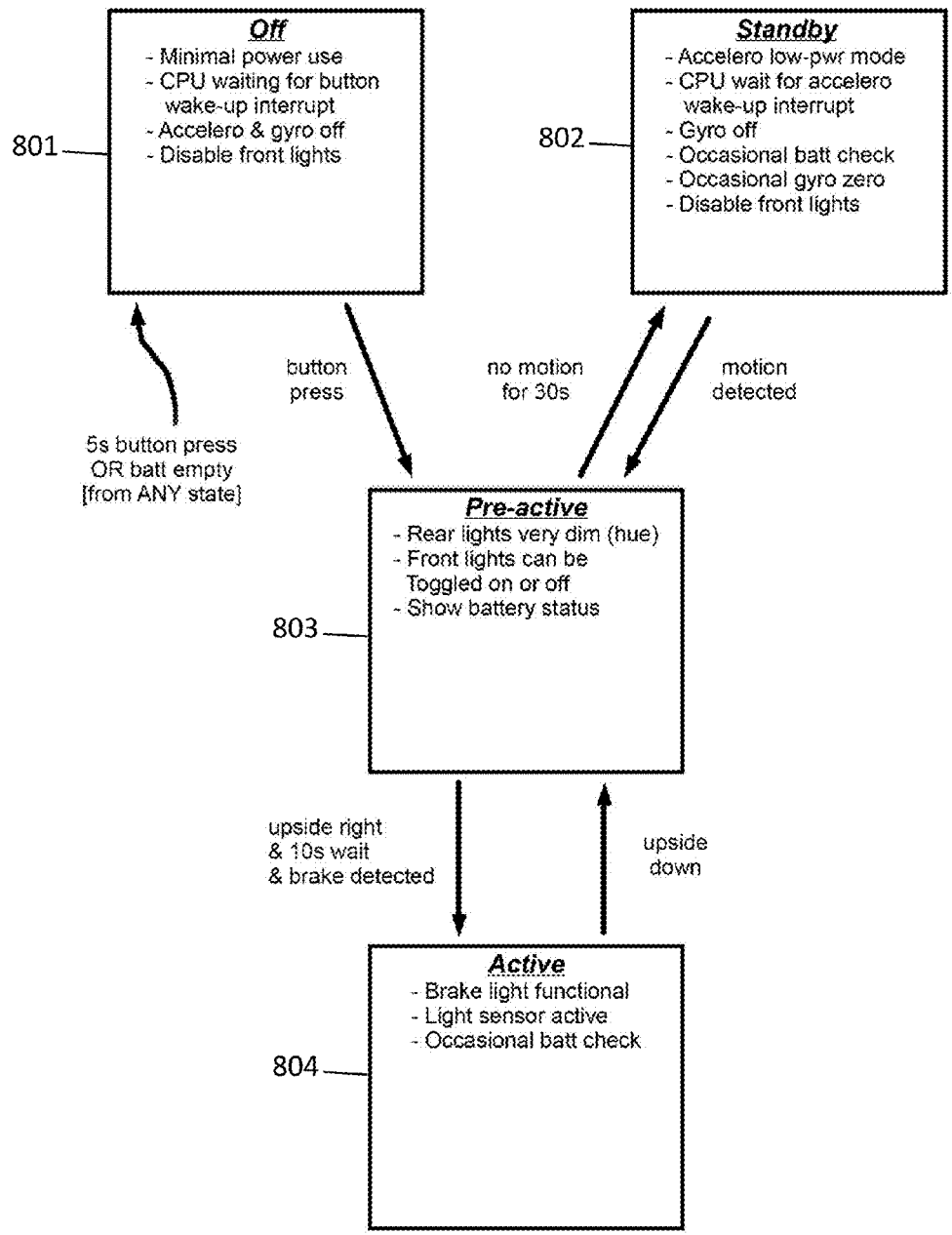
FIG. 8 shows the functions and operational power states of one embodiment of the present invention.

Turning to FIG. 7, this diagram shows the interaction of the sensors with the braking detection algorithm in one possible embodiment of the system. In this embodiment of the algorithm, the processor may take data from the gyroscope and the accelerometer of the system 701. The gyroscope data may be drift compensated 702, then orientation is calculated based solely on the gyroscope data 703. In parallel, orientation is calculated based on the accelerometer 704. Then, the two calculations may be reconciled with each other. A best estimate of orientation may calculated by fusing the accelerometer and gyroscope data together 705. Then, the accelerations may be converted to the horizontal frame 706, as discussed above. From this final calculation, the accelerations may be compared to a threshold value to determine whether there is braking 708, or another motions, such as cornering 707. If acceleration in the braking direction is detected, then the processor sends a signal to actuate the brake light. FIG. 8 details the power and function distribution of one embodiment of the system, including what features are operable during "Off" 801, during "Standby" 802, when the unit is "Pre-active" 803, and what features are operable when the unit is "Active" 804.

In yet another embodiment, a compass may be used to improve accuracy on cornering detection and therefore more accurately determine when to alter the filtering for the drift correction and/or the complementary filter. Another way to improve accuracy would be to have a calibration or "training mode" that remembers how hard a rider typically brakes, and learns extraneous motions that a particular rider uses when not braking, to filter them out during normal operation.

Further, acceleration caused by fast pitching motion of the head may be subtracted from the end result, as a further increase in signal accuracy to detect only braking motions. This may be done to prevent a brake detection when moving the head while quickly looking on the dashboard.

In yet another embodiment, the calculated deceleration is low-pass filtered and compared to a threshold to detect a braking condition. The light on-time has a minimum length and may be a multiple of the time that the threshold is exceeded. A higher secondary threshold can be used to detect very fast braking which may result in a special light sequence to indicate urgency. A lower (lowest) threshold is used to detect the end of a braking event.

Another optional feature of the system is where light indication may be implemented when the vehicle is at standstill as many accidents occur when motorcycles are rear-ended while waiting at a traffic light. Vibration on accelerometers and/or gyroscopes can be used to estimate motion conditions. Also, the vehicle velocity may be estimated by integrating the accelerometer signals. The accuracy of this can be further increased by the use of GPS.

The system may have further accessory features to make the lamp more useful. For example, the lamp could have forward-facing white lamps. And, when used in the detachable, all-in-one embodiment, the system could have features to operate as a lamp for the user. For example, when it is picked up, the motion could be used to light the lamps prior to operation to assist the rider in finding his way around. Then, the system could go into standby mode automatically when it no longer senses any motion, to save battery life. In another embodiment, the system may sense when the system is fully stopped, such as at a stop light, and correspondingly flash the brake light at that time. Or, the system could be automatically powered off when it is turned over or upside-down, or on its back. Further, the system, even as a single unit embodiment, could additionally have a wireless interface, that interacts with the user's phone. In one embodiment, the phone could be used to program features of the device or to deliver firmware updates. In another embodiment, the system could send a message to the phone to call services in the event that a hard impact acceleration is detected during operation, indicating an accident.

Any combination of the above features and options could be combined into a wide variety of embodiments. It is, therefore, apparent that there is provided in accordance with the present disclosure, systems and methods for designing and implementing safety indicator lamp systems for helmets. While this invention has been described in conjunction with a number of embodiments, it is evident that many alternatives, modifications, and variations would be, or are apparent to, those of ordinary skill in the applicable arts. Accordingly, applicants intend to embrace all such alternatives, modifications, equivalents and variations that are within the spirit and scope of this invention.

We claim:

1. A system for providing vehicle indicator lights, comprising:
   at least one indicator light;
   a gyroscopic sensor;
   an accelerometer;
   a signal processing unit operable to receive inputs from said gyroscopic sensor and said accelerometer and further operable to activate said at least one indicator light based on inputs from said gyroscopic sensor and said accelerometer, wherein said at least one indicator light comprises at least one brake light, and wherein said inputs from said gyroscopic sensor and said accelerometer are both used to determine an orientation of said system, and wherein said orientation is used to calculate a braking acceleration for said system; and
   a power source powering said system.

2. The system of claim 1, further comprising a housing containing said at least one indicator light, said gyroscopic sensor, said accelerometer, and said power source.

3. The system of claim 2, wherein said housing has an attachment feature for attaching the housing to an object, wherein said object is selected from the group consisting of: a helmet, clothing or a bag.

4. The system of claim 1, wherein said system is contained in a helmet, wherein said helmet comprises said at least one indicator light, said gyroscopic sensor, said accelerometer, and said power source.

5. The system of claim 4, wherein said inputs from said gyroscopic sensor and said accelerometer are used to estimate a head orientation of a rider wearing said helmet and to compensate for said rider moving their head.

6. The system of claim 1, wherein said at least one indicator light further comprises at least one turn signal light.

7. The system of claim 6, wherein said at least one turn signal light is activated by said signal processing unit based on inputs from said gyroscopic sensor and said accelerometer upon a head rotation of a vehicle operator.

8. The system of claim 1, further comprising a daylight sensor.

9. The system of claim 1, wherein said signal processing unit is further operable to:
   determine when said system has come to a stop based on inputs from said gyroscopic sensor and said accelerometer; and
   flash said brake light while said system is stopped.

10. The system of claim 1, wherein said gyroscopic sensor is further operable to activate at least one brake light based on inputs from said gyroscopic sensor and said accelerometer upon detection of a vehicle braking motion.

11. The system of claim 10, wherein said detection is self-calibrating.

12. The system of claim 11, wherein said self-calibrating is suspended or adapted while said vehicle is cornering.

13. The system of claim 10, wherein said detection of vehicle braking motion is in response to exceeding a threshold magnitude of motion.

14. The system of claim 13, wherein said signal processing unit is further operable to use said inputs from said gyroscopic sensor and said accelerometer to identify false positive braking signals and to prevent said brake light from illuminating when said vehicle is not braking.

15. The system of claim 13, wherein said at least one brake light is flashed in response to said signal processing unit detecting that a second, higher threshold of motion has been exceeded.

16. The system of claim 1, wherein said gyroscopic sensor is operable to isolate and analyze a braking motion of said system in a horizontal frame, and wherein said gyroscopic sensor is further operable to filter out accelerations due to other non-braking motions.

17. The system of claim 1, wherein said gyroscope is drift compensated to estimate an angular orientation and angular velocity of said system.

18. A system for providing vehicle indicator lights, comprising:
   at least one brake indicator light;
   at least one turn signal indicator light;
   an orientation sensor;
   an accelerometer;
   a first control subsystem that receives inputs from said orientation sensor and said accelerometer and activates said at least one brake indicator light based on inputs from said orientation sensor and accelerometer, upon the detection of a threshold magnitude of vehicle braking motion, wherein said inputs from said orientation sensor and said accelerometer are both used to determine an orientation of said system, and wherein said orientation is used to calculate a braking acceleration for said system;
   a second control subsystem that receives inputs from said orientation sensor and said accelerometer and activates said at least one turn signal indicator light based on inputs from said orientation sensor and accelerometer, upon the detection of a predetermined type of head rotation of an operator of said vehicle the vehicle;
   a power source powering said system; and
   a helmet containing said at least one brake indicator light, said at least one turn signal indicator light, said orientation sensor, said first and second control subsystems, and said power source.

19. A method of providing indicator light functions to a vehicle, the method comprising the steps of:
   receiving output from a gyroscope;
   receiving output from an accelerometer;
   processing said output from said gyroscope and said output from said accelerometer; and
   lighting an indicator light in response to said processing of said outputs, wherein said indicator light comprises at least one brake indicator light and at least one turn signal indicator light, wherein said outputs from said gyroscope and said accelerometer are both used to determine an orientation of a system, wherein said system comprises said gyroscope and said accelerometer and is deployed within said vehicle, and wherein said orientation is used to calculate a braking acceleration for said system in order to control said brake indicator light.

20. The method of claim 19, further comprising the steps of:
   activating said at least one brake indicator light upon detection of a threshold magnitude of vehicle braking motion using said output from said gyroscope and said output from said accelerometer; and
   activating said at least one turn signal indicator light upon detection of a specific head rotation of a user using said output from said gyroscope and said output from said accelerometer.

* * * * *